US010903510B2

(12) United States Patent
Kawahigashi et al.

(10) Patent No.: US 10,903,510 B2
(45) Date of Patent: Jan. 26, 2021

(54) REDOX FLOW BATTERY

(71) Applicant: Sumitomo Electric Industries, Ltd., Osaka (JP)

(72) Inventors: Kazutaka Kawahigashi, Osaka (JP); Atsuo Ikeuchi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 178 days.

(21) Appl. No.: 16/071,547

(22) PCT Filed: Nov. 22, 2017

(86) PCT No.: PCT/JP2017/042015
§ 371 (c)(1),
(2) Date: Jul. 20, 2018

(87) PCT Pub. No.: WO2019/102544
PCT Pub. Date: May 31, 2019

(65) Prior Publication Data
US 2019/0237782 A1    Aug. 1, 2019

(51) Int. Cl.
*H01M 8/04186* (2016.01)
*H01M 8/18* (2006.01)
(Continued)

(52) U.S. Cl.
CPC ... *H01M 8/04186* (2013.01); *H01M 8/04201* (2013.01); *H01M 8/04671* (2013.01);
(Continued)

(58) Field of Classification Search
CPC ......... H01M 8/04186; H01M 8/04201; H01M 8/04671; H01M 8/18; H01M 8/188; H01M 8/2475
See application file for complete search history.

(56) References Cited

U.S. PATENT DOCUMENTS

2016/0006051 A1* 1/2016 Winter .............. H01M 8/04201
429/418

FOREIGN PATENT DOCUMENTS

DE   202018102309 U1 * 5/2018   ........ H01M 8/04201
JP   2002-025599 A    1/2002
(Continued)

OTHER PUBLICATIONS

English translation of DE-202018102309-U1 (Year: 2018).*

*Primary Examiner* — Christopher P Domone
*Assistant Examiner* — Kimberly Wyluda
(74) *Attorney, Agent, or Firm* — Baker Botts L.L.P.; Michael A. Sartori

(57) ABSTRACT

A redox flow battery includes a battery cell, a tank which stores an electrolyte to be supplied to the battery cell, piping which is connected to the battery cell and the tank and configured to circulate the electrolyte, a container which houses the battery cell, the tank, and the piping all together, and a partition wall which is provided inside the container and prevents the electrolyte from leaking out of the container. The height of the partition wall is equal to or greater than a liquid level height at the time when a predetermined amount of electrolyte leaks into the container as a consequence of damage to the piping, and the predetermined amount includes the total of an amount equivalent to the volume of the battery cell and an amount equivalent to the volume of the piping.

9 Claims, 6 Drawing Sheets

(51) Int. Cl.
  *H01M 8/04664* (2016.01)
  *H01M 8/04082* (2016.01)
  *H01M 8/2475* (2016.01)

(52) U.S. Cl.
  CPC ............. *H01M 8/18* (2013.01); *H01M 8/188* (2013.01); *H01M 8/2475* (2013.01)

(56) References Cited

FOREIGN PATENT DOCUMENTS

| | | |
|---|---|---|
| JP | 2009-032550 A | 2/2009 |
| WO | 2012-094674 A2 | 7/2012 |

* cited by examiner

REDOX FLOW BATTERY

TECHNICAL FIELD

The present invention relates to a redox flow battery.

BACKGROUND ART

Redox flow batteries (hereinafter, may be referred to as "RF batteries") are one type of large-capacity storage battery. An RF battery includes, as shown in FIG. 5 of Patent Literature 1, a battery cell, a positive electrolyte tank for storing a positive electrolyte to be supplied to the battery cell, a negative electrolyte tank for storing a negative electrolyte to be supplied to the battery cell, and piping (pipelines) which is connected to the battery cell and the positive and negative electrolyte tanks and configured to circulate the positive electrolyte and the negative electrolyte.

CITATION LIST

Patent Literature

PTL 1: Japanese Unexamined Patent Application Publication No. 2002-025599

SUMMARY OF INVENTION

A redox flow battery according to the present disclosure includes a battery cell, a tank which stores an electrolyte to be supplied to the battery cell, piping which is connected to the battery cell and the tank and configured to circulate the electrolyte, a container which houses the battery cell, the tank, and the piping all together, and a partition wall which is provided inside the container and prevents the electrolyte from leaking out of the container. The height of the partition wall is equal to or greater than a liquid level height at the time when a predetermined amount of electrolyte leaks into the container as a consequence of damage to the piping, and the predetermined amount includes the total of an amount equivalent to the volume of the battery cell and an amount equivalent to the volume of the piping.

DESCRIPTION OF EMBODIMENTS

Figure 1:
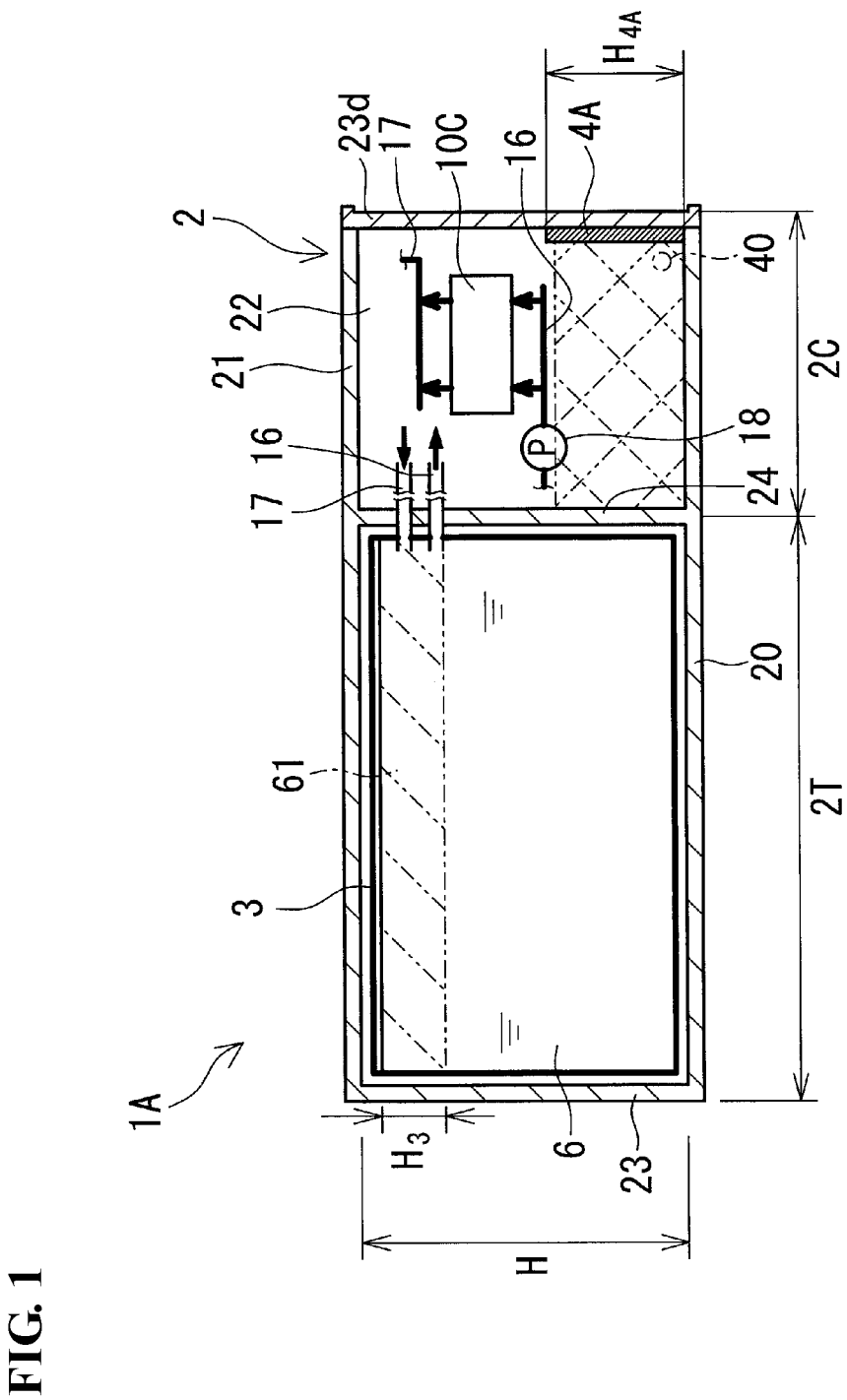
FIG. 1 is a longitudinal sectional view of a redox flow battery according to Embodiment 1, taken along a plane orthogonal to the container width direction.

Problems to be Solved by the Present Disclosure

A redox flow battery is assembled, typically, by transporting components, such as a battery cell, a tank, and piping, to an installation location and connecting the components together at the installation location. However, there may be a case where a sufficient workspace cannot be secured at the installation location, and it is difficult to perform assembly work. Accordingly, the present inventors have studied a method in which the components are assembled at a place where a workspace is easily secured, for example, at a plant, and the redox flow battery in the assembled state is transported to the installation location. In particular, it has been studied to house the components all together in a large-volume case, such as a cargo container.

When the components are housed all together in the case such as the container, transportation is facilitated, the components can be protected, and a large battery cell or large tank can be housed, thus enabling construction of a high-output battery or large-capacity battery. In the case where a large battery cell is provided and the amount of electrolyte that can be held in the battery cell and piping is large, if the piping and the like are damaged and at least part of or all of the electrolyte held in the battery cell and the piping leaks into the container, there is a possibility that the electrolyte will leak out of the container through a gap or the like around a door provided in the container. Furthermore, in the case where a large tank is provided and the amount of electrolyte stored is large, if the piping and the like are damaged and, in addition to the electrolyte inside the battery cell and the electrolyte inside the piping, the electrolyte inside the tank also leaks into the container, the probability of leakage out of the container increases. It is conceivable to prevent further leakage of the electrolyte by constructing a dam portion so as to surround the outer periphery of the container at the installation location of the container. However, when a dam portion is constructed with concrete or the like, and the inner surface of the dam portion is subjected to painting or the like to prevent corrosion due to the electrolyte, the installation period including the construction of the dam portion is prolonged. Furthermore, in the case where changes in the arrangement position or the like are required after the installation of the container, it is necessary to demolish the dam portion and to separately construct a dam portion at a new arrangement position of the container, which also prolongs the construction period at the time of change in arrangement. Therefore, it is desirable to prevent the electrolyte inside the container from leaking out of the container while it is possible to easily perform installation and changes in arrangement by using a simple structure.

Accordingly, it is an object to provide a redox flow battery which can prevent an electrolyte from leaking out of a container.

Advantageous Effects of the Present Disclosure

According to a redox flow battery of the present disclosure, it is possible to prevent an electrolyte from leaking out of a container.

DESCRIPTION OF EMBODIMENTS OF THE PRESENT INVENTION

First, the embodiments of the present invention will be enumerated and described.

(1) A redox flow battery (RF battery) according to an aspect of the present invention includes a battery cell, a tank which stores an electrolyte to be supplied to the battery cell, piping which is connected to the battery cell and the tank and configured to circulate the electrolyte, a container which houses the battery cell, the tank, and the piping all together, and a partition wall which is provided inside the container and prevents the electrolyte from leaking out of the container. The height of the partition wall is equal to or greater than a liquid level height at the time when a predetermined amount of electrolyte leaks into the container as a consequence of damage to the piping, and the predetermined amount includes the total of an amount equivalent to the volume of the battery cell and an amount equivalent to the volume of the piping.

The RF battery includes a partition wall which is provided inside a container which houses components, such as a battery cell, a tank, and piping. The height of the partition wall is adjusted such that, even if the piping and the like connected to the tank are damaged to result in leakage of the total of all the amount of electrolyte inside the battery cell and all the amount of electrolyte held inside the piping (hereinafter, may be referred to as the "leakage amount from the cell and the like") into the container, the upper end of the partition wall is located above the liquid level of the electrolyte that has leaked into the container (hereinafter, may also be referred to as the "liquid level of the leaked liquid"). Since the RF battery includes the partition wall with such a specific height, in the case where part of the electrolyte inside the battery cell or part of the electrolyte inside the piping leaks into the container, and even in the case where leakage of the total of all the amounts of electrolyte inside the battery cell and the piping into the container occurs, it is possible to surely prevent further leakage out of the container. For example, in the case where the RF battery is configured such that the electrolyte is made to flow upward from the lower part of the battery cell and is returned to the tank (hereinafter, referred to as a "rising configuration", if piping on the supply side is damaged, all the amount of electrolyte inside the battery cell can leak into the container. Even in such a case, by providing the partition wall with a specific height set on the basis of the leakage amount from the cell and the like, it is possible to surely prevent the electrolyte that has leaked into the container from further leaking out of the container. Furthermore, although the RF battery has a simple structure including a partition wall with a specific height, the dam portion surrounding the outer periphery of the container described above can be omitted, or the structure of the dam portion can be simplified, and shortening of the installation period and shortening of the construction period at the time of change in arrangement can be expected.

(2) In an embodiment of the RF battery, the predetermine amount further includes an amount equivalent to the volume of electrolyte stored above a connection portion with the piping in the tank, out of all the electrolyte stored in the tank.

For example, in the case where the connection portion with the piping in the tank is located at a position equal to or lower than the liquid level of the electrolyte in the tank, out of all the electrolyte stored in the tank, the leakage amount due to damage to the piping and the like corresponds to the volume of electrolyte stored above the connection portion with the piping in the tank (hereinafter, may be referred to as the "upper volume"). The height of the partition wall provided in the embodiment may be adjusted by adding the amount equivalent to the upper volume to the leakage amount from the cell and the like. Since the embodiment includes the partition wall with such a specific height, even in the case where part of the electrolyte stored in the tank leaks into the container as a consequence of damage to the piping and the like, the upper end of the partition wall is located above the liquid level of the leaked liquid, and it is possible to surely prevent further leakage out of the container. Even when the rising configuration is employed, by providing the partition wall with a specific height set on the basis of the leakage amount from the cell and the like and the amount equivalent to the upper volume, even if piping on the supply side is damaged, it is possible to surely prevent the electrolyte that has leaked into the container from further leaking out of the container.

(3) In an embodiment of the RF battery according to item (2), the connection portion with the piping in the tank is located higher than the position corresponding to 70% of the height of the container from the inner bottom face of the container.

According to the embodiment, since the connection portion with the piping in the tank is arranged at a relatively high position in the container, even when the connection portion is located at a position equal to or lower than the liquid level in the tank, the upper volume is likely to be decreased. That is, the leakage amount from the tank as a consequence of damage to the piping and the like is likely to be decreased. From this standpoint, according to the embodiment, leakage of the electrolyte out of the container is more likely to be prevented. In the case where the connection portion with the piping in the tank is arranged at the position corresponding to 100% of the height of the container, i.e., on the top face of the tank, even when the liquid level inside the tank is located at a relatively high position, the upper volume can be decreased to substantially zero. In this case, the height of the partition wall can be decreased to such an extent that leakage of the electrolyte out of the container can be prevented, and thus, the size and weight of the partition wall can be reduced.

(4) According to an exemplary embodiment of the RF battery, the RF battery further includes a lower pit portion which is fitted to a bottom of the container. The bottom of the container has an opening passing therethrough from the inside to the outside thereof, and the lower pit portion includes a storage tank which stores the electrolyte that has leaked into the container and passed through the opening.

According to the embodiment, since the electrolyte that has leaked into the container can be stored in the lower pit portion, the liquid level of the leaked liquid inside the container can be further lowered. Therefore, according to the embodiment, even when the height of the partition wall is further decreased, leakage of the electrolyte out of the container can be prevented, and it is possible to easily avoid immersion of electrical equipment, such as a battery cell and a control unit, in the leaked electrolyte. Furthermore, omission of the dam portion due to provision of the lower pit portion, shortening of the installation period and the construction period at the time of change in arrangement as a result of omission of the dam portion, improvement in assembly workability due to reduction in the size and weight of the partition portion, and the like can be expected. In addition, according to the embodiment, when the container and the lower pit portion are integrated with each other at a plant or the like and transported at the same time to an installation side, assembling of the lower pit portion at the installation site is not required, and the workload at the installation site can be reduced.

(5) According to an exemplary embodiment of the RF battery of item (4), a leak detection sensor is provided inside the storage tank.

Here, since the storage tank of the lower pit portion is located below the bottom of the container, when leakage of the electrolyte into the container occurs, the storage tank is a place where the electrolyte is first accumulated. According to the embodiment, since the leak detection sensor is provided inside the storage tank, leakage of the electrolyte can be detected in the early stage of leakage, i.e., during the period when the leakage amount is relatively small, and measures, such as stopping of circulation of electrolyte, can be taken earlier. From this standpoint, according to the embodiment, the leakage of the electrolyte out of the container can be more surely prevented.

(6) According to an exemplary embodiment of the RF battery, a leak detection sensor is provided at a position below an upper end of the partition wall, inside the container.

According to the embodiment, leakage of the electrolyte can be detected before the liquid level of the leaked liquid reaches the upper end of the partition wall. That is, leakage of the electrolyte can be detected during the period when the leakage amount is small to a certain extent, and measures, such as stopping of circulation of electrolyte, can be taken earlier. From this standpoint, according to the embodiment, the leakage of the electrolyte out of the container can be more surely prevented.

DETAILED DESCRIPTION OF EMBODIMENTS OF THE PRESENT INVENTION

Redox flow batteries (RF batteries) according to the embodiments of the present invention will be specifically described below with reference to the drawings. In the drawings, the same reference signs denote the same components.

Embodiment 1

An RF battery 1A according to Embodiment 1 will be described below with reference to mainly FIGS. 1 and 2.

FIG. 1 is a longitudinal sectional view of a container 2, taken along a plane orthogonal to the container width direction, and shows in a simplified manner the internal structure.

Figure 2:
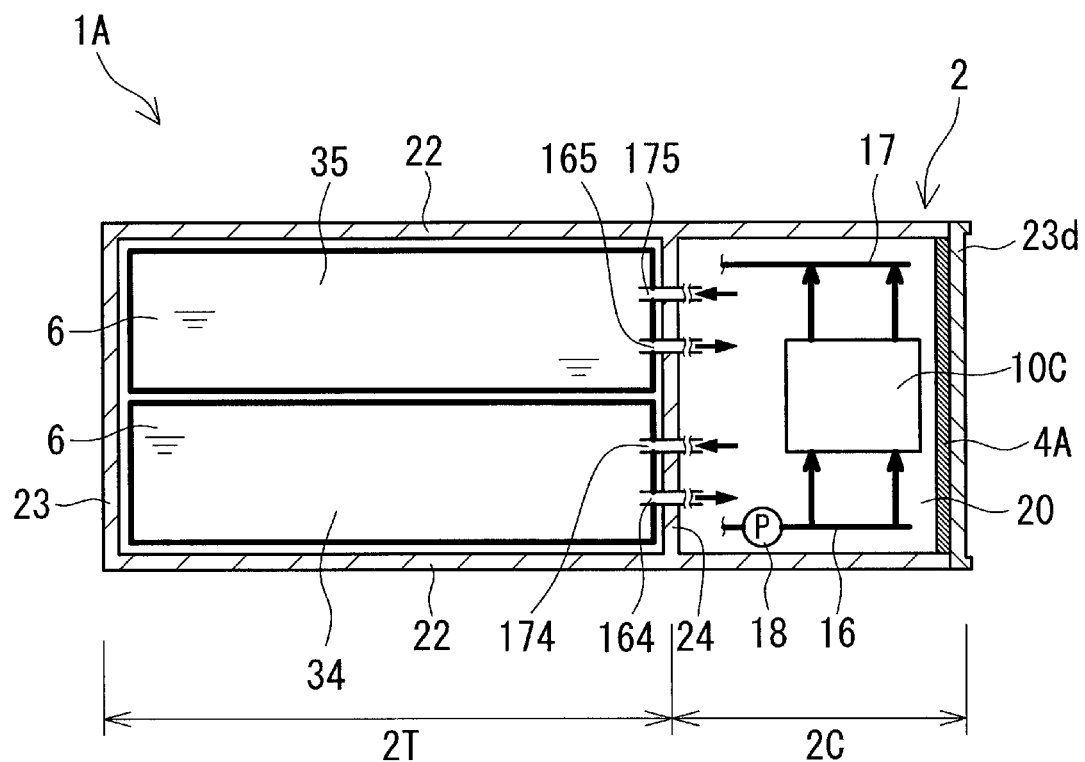
FIG. 2 is a horizontal sectional view of the redox flow battery according to Embodiment 1, taken along a plane orthogonal to the container height direction.

FIG. 2 is a horizontal sectional view of the container 2, taken along a plane orthogonal to the container height direction, and shows in a simplified manner the internal structure.

(Basic Structure)

The RF battery 1A according to Embodiment 1 includes a battery cell 10C and a supply mechanism configured to circulate and supply an electrolyte to the battery cell 10C. The supply mechanism includes a tank 3 which stores the electrolyte to be supplied to the battery cell 10C and pipes 16 and 17 which are connected to the battery cell 10C and the tank 3 and configured to circulate the electrolyte. Typically, the RF battery 1A is connected, through an alternating current/direct current converter, to a power generation unit and a load, performs charging by using the power generation unit as an electric power supply source, and performs discharging to the load as an electric power supply target (none of these shown). Examples of the power generation unit include solar photovoltaic power generators, wind power generators, and other general power plants. Examples of the load include consumers and the like. Charging and discharging are performed by using a positive electrolyte and a negative electrolyte, each containing, as an active material, ions (typically, metal ions) whose valence is changed by oxidation-reduction, and by using the difference in the oxidation-reduction potential between the positive and negative ions.

In particular, the RF battery 1A according to Embodiment 1 includes a container 2 which houses components, such as the battery cell 10C, the tank 3, and the pipes 16 and 17, all together, and a partition wall 4A which is provided inside the container 2 and prevents the electrolyte from leaking out of the container 2. By setting the height $H_{4A}$ of the partition wall 4A to a specific height, even when the pipes 16 and 17 and the like are damaged and a predetermined amount of electrolyte leaks into the container 2, the RF battery 1A can prevent further leakage out of the container 2.

Each of the components will be described in detail below.

(Battery Cell)

Figure 5:
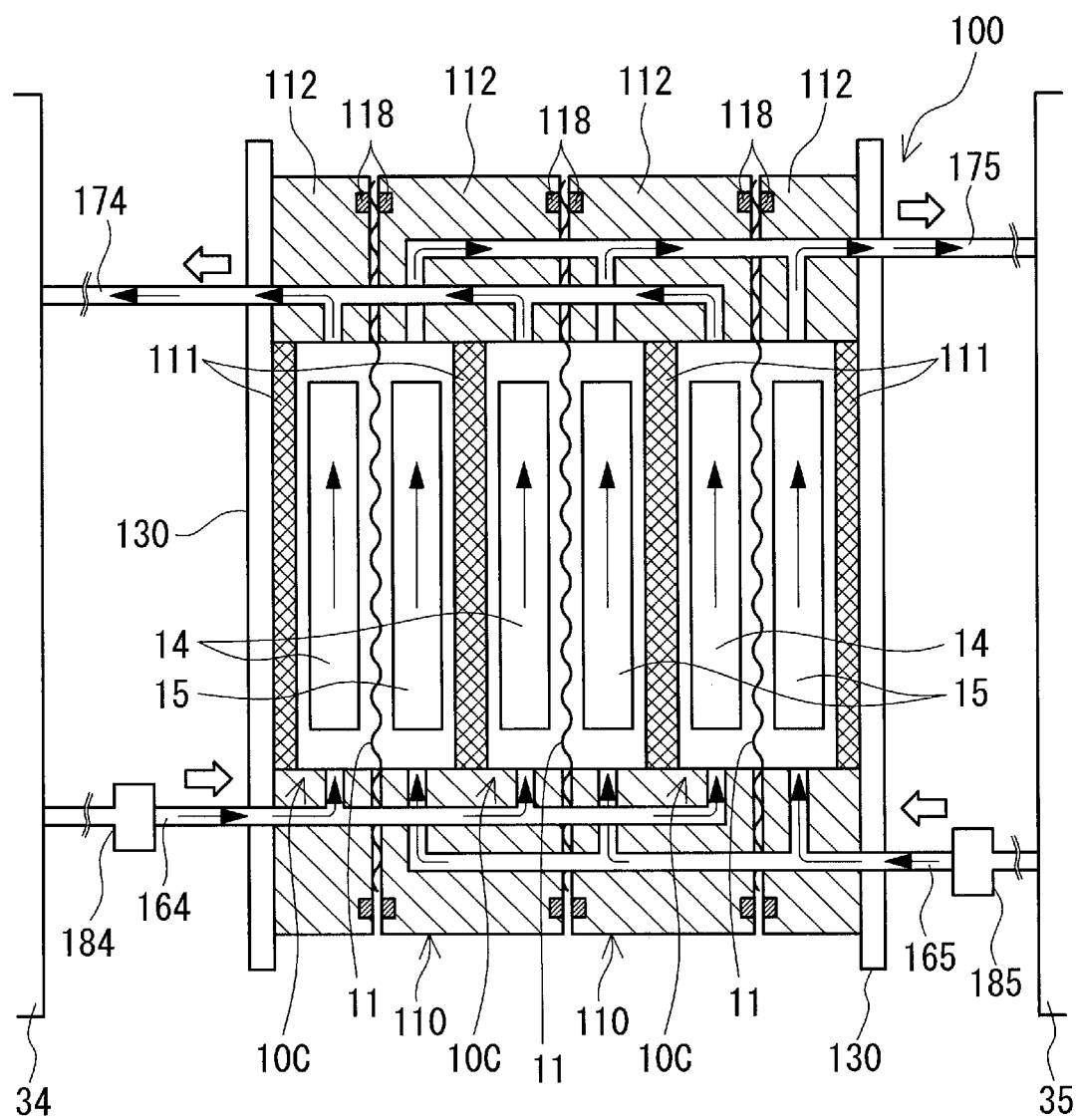
FIG. 5 is a schematic sectional view showing a cell stack used in a redox flow battery according to an embodiment.
Figure 6:
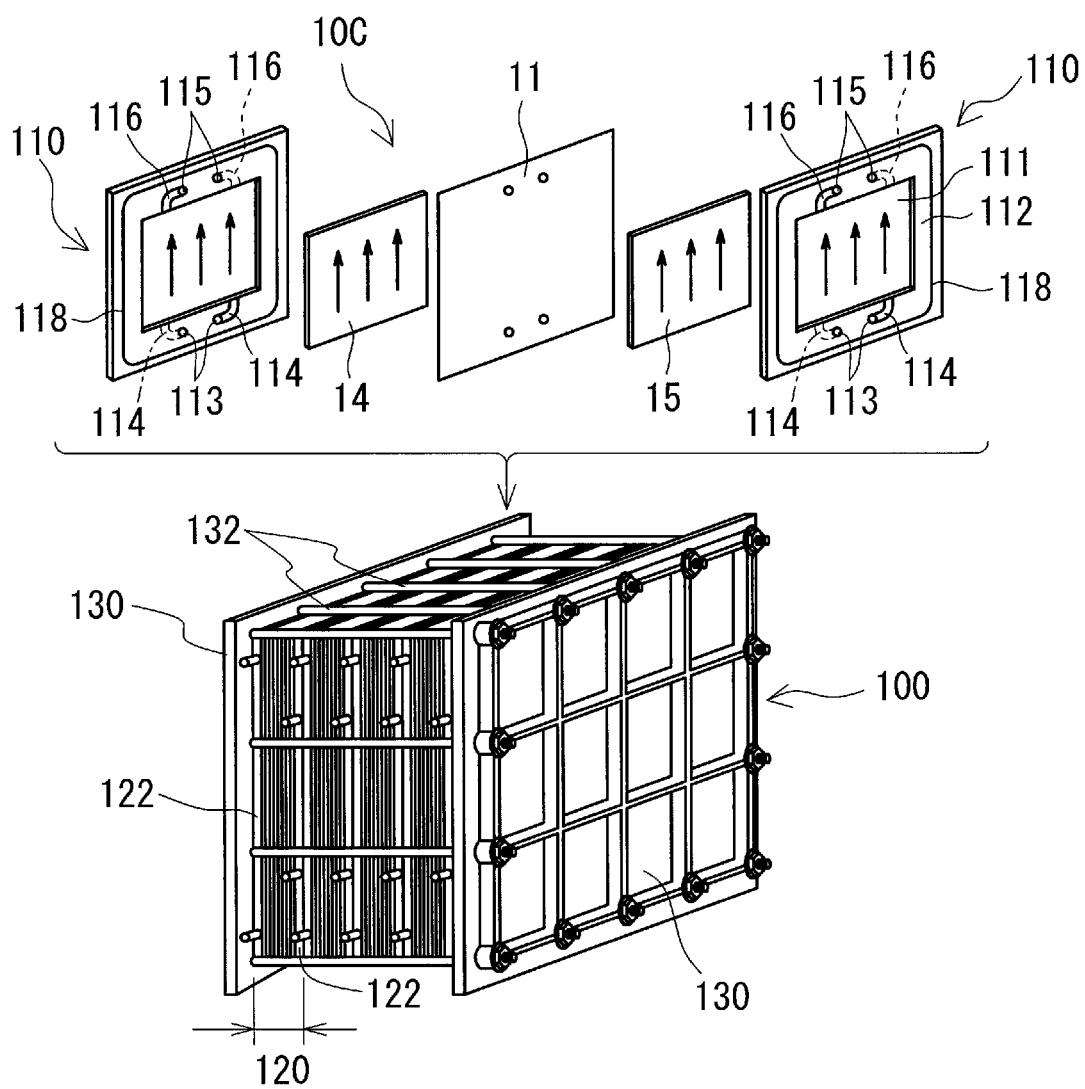
FIG. 6 is a schematic diagram showing a cell stack used in a redox flow battery according to an embodiment.

The battery cell 10C includes, as shown in FIGS. 5 and 6, a positive electrode 14 to which the positive electrolyte is supplied, a negative electrode 15 to which the negative electrolyte is supplied, and a membrane 11 interposed between the positive electrode 14 and the negative electrode 15.

The positive electrode 14 and the negative electrode 15 are reaction sites to which the positive electrolyte and the negative electrolyte are supplied, respectively, and in which the active material causes battery reactions. Porous bodies, such as fiber assemblies of a carbon material, are used.

The membrane 11 is a member that separates the positive electrode 14 and the negative electrode 15 from each other and also allows specific ions (e.g., hydrogen ions) to permeate therethrough. An ion exchange membrane or the like is used.

The battery cell 10C is typically constructed by using a cell frame 110 illustrated in FIG. 6. The cell frame 110 includes a bipolar plate 111 and a frame body 112 provided on the periphery of the bipolar plate 111.

The bipolar plate 111 typically has a positive electrode 14 disposed on one surface thereof and a negative electrode 15 disposed on the other surface thereof and is a conductive member that conducts an electric current but does not pass electrolyte therethrough. A conductive plastic plate containing graphite or the like and an organic material is used as the bipolar plate 111.

The frame body 112 is an insulating member having liquid supply holes 113 and slits 114 for supplying the positive electrolyte and the negative electrolyte, respectively, to the positive electrode 14 and the negative electrode 15 which are disposed inside the frame, and liquid drainage holes 115 and slits 116 for discharging the positive electrolyte and the negative electrolyte, respectively, to the outside of the battery cell 10C. As the constituent material for the frame body 112, a resin or the like (such as polyvinyl chloride or polyethylene) that does not react with electrolyte and has resistance to electrolyte may be used. A ring-shaped groove is provided close to the outer periphery of the frame body 112, and a sealing material 118 is disposed therein. As the sealing material 118, an elastic material, such as an O-ring or flat packing, is used.

As the battery cell 10C, either a unit cell battery including a single battery cell 10C or a multi-cell battery in which a plurality of battery cells 10C are stacked can be used.

In the multi-cell battery, a configuration referred to as a cell stack 100 is used. The cell stack 100 typically includes a layered body in which a cell frame 110 (bipolar plate 111), a positive electrode 14, a membrane 11, and a negative electrode 15 are stacked in this order repeatedly, a pair of end plates 130 which sandwich the layered body, and a plurality of fastening members 132 which fasten between the two end plates 130. The fastening force in the stacking direction maintains the stacked state and also presses the sealing material 118 disposed between adjacent frame bodies 112 such that the layered body is maintained in a fluid-tight manner (also refer to FIG. 5), thus preventing leakage of electrolyte from the battery cell 10C. The number of battery cells 10C (number of cells) in the cell stack 100 can be appropriately selected. As the number of cells is increased, a high-output battery is more easily produced. In addition, as illustrated in FIG. 6, a cell stack 100 can be an assemblage made by stacking a plurality of sub-cell stacks 120, each sub-cell stack 120 being a layered body including a predetermined number of cells. Each sub-cell stack 120 can be provided with electrolyte supply/drainage plates 122.

Although FIG. 1 illustrates the case where the number of cell stacks 100 (number of stacks) to be housed in the container 2 is one, the number of stacks can be appropriately changed. When the number of stacks is plural, a high-output battery is easily produced. In either configuration of unit cell battery or multi-cell battery, when large electrodes are provided, a high-output battery is easily produced. When a large case, such as the container 2, is used, a plurality of cell stacks 100 or a large cell stack 100 can be housed.

(Circulation Mechanism)

A circulation mechanism includes a positive electrolyte tank 34 (FIG. 2) which stores a positive electrolyte to be circulated and supplied to the positive electrode 14, a negative electrolyte tank 35 (FIG. 2) which stores a negative electrolyte to be circulated and supplied to the negative electrode 15, pipes 164 and 174 (FIGS. 2 and 5) which connect between the positive electrolyte tank 34 and the battery cell 10C (typically, a cell stack 100, hereinafter the same), pipes 165 and 175 (FIGS. 2 and 5) which connect between the negative electrolyte tank 35 and the battery cell 10C, and a positive electrolyte pump 184 and a negative electrolyte pump 185 (FIG. 5) provided on the outgoing pipes 164 and 165 for supplying the electrolytes to the battery cell 10C from the tanks 34 and 35, respectively. The outgoing pipes 164 and 165 and the return pipes 174 and 175 for returning the electrolytes from the battery cell 10C to the tank 3 are connected to the corresponding pipelines formed by the liquid supply holes 113 and the liquid drainage holes 115, thus constituting a circulation passage for the positive electrolyte and a circulation passage for the negative electrolyte.

FIG. 1 shows a tank 3, an outgoing pipe 16, a return pipe 17, and a pump 18, one each, for convenience of explanation. Actually, as described above, the tank 34, the pipes 164 and 174, and the pump 184 for the positive electrode, and the tank 35, the pipes 165 and 175, and the pump 185 for the negative electrode are included. The same applies to FIG. 2. Hereinafter, these components may be collectively referred to as the tank 3, the pipes 16 and 17, and the pump 18 in some cases.

As the constituent material for the pipes 16 and 17, the above-described resin or the like that does not react with electrolyte and has resistance to electrolyte may be used. Typically, as illustrated in FIG. 1, one end of each of the pipes 16 and 17 is arranged at a position equal to or lower than the liquid level of the electrolyte in the tank 3, and the other end is connected to the battery cell 10C and the like. Each of the pipes 16 and 17 has a connection portion with the tank 3 at the intermediate portion thereof.

As the pump 18, a known one can be appropriately used.

As the electrolytes, electrolytes which include vanadium ions as positive and negative active materials (Patent Literature 1), electrolytes which include manganese ions as a positive electrode active material and titanium ions as a negative electrode active material, and other electrolytes having known compositions can be used.

The tank 3 is a box-shaped case for storing the electrolyte. The shape of the tank 3 can be appropriately selected. When a shape that follows the shape of the container 2, a rectangular parallelepiped shape in this example, is selected, the amount of electrolyte stored is easily increased by increasing the volume of the tank 3. The positive electrolyte tank 34 and the negative electrolyte tank 35 in this example are each in the shape of a horizontally long rectangular parallelepiped and have the same size. The combined shape of the two tanks 34 and 35 follows the inner peripheral shape of a tank chamber 2T, which will be described later, and the combined width is slightly smaller than the inside dimension of the tank chamber 2T (FIG. 2). The height of the two tanks 34 and 35 is substantially the same as the height H of the container 2 (FIG. 1). In this example, the two tanks 34 and 35 are housed so as to be arranged side by side in the width direction of the container 2 (in the upward-downward direction in FIG. 2). In FIG. 5, for convenience of explanation, the tanks 34 and 35 are shown on the left and right sides of the sheet, respectively. As the constituent material for the tank 3, the above-described resin that does not react with electrolyte and has resistance to electrolyte, rubber, or the like may be used. When the tank 3 is composed of a flexible material, such as rubber, since elastic deformation is possible, even a large-volume tank 3 is easily housed in the container 2. Even when the internal pressure of the tank 3 varies, the stress due to the internal pressure is easily relieved by elastic deformation. Furthermore, by transporting the RF battery 1A in an empty state without storing the electrolyte 6 inside the tank 3 before installation of the RF battery 1A and by storing the electrolyte 6 inside the tank 3 after installation, the weight of the RF battery 1A can be reduced, and transportation and installation work are easily performed.

The arrangement positions of a connection portion with the outgoing pipe 16 and a connection portion of the return pipe 17 in the tank 3 can be appropriately selected. FIG. 1 illustrates the case where both of the connection portions are provided on the side wall of the rectangular parallelepiped tank 3 and located below the liquid level of the electrolyte in the tank 3. In addition, at least one of the connection portions may be provided on the top face of the tank 3 and located above the liquid level in the tank 3 (not shown, refer to Embodiment 4, which will be described later).

Regarding the circulation passage of the positive electrolyte and the circulation passage of the negative electrolyte, for example, a rising configuration in which the electrolytes from the tank 3 are made to flow upward from the lower part of the battery cell 10C and are returned to the tank 3 may be used. In the rising configuration, the electrolytes easily diffuse over the entire regions of the electrodes, and from this standpoint, battery characteristics are easily enhanced, which is preferable. The cell frame 110 shown in FIG. 6 has the liquid supply holes 113 on the lower side and the liquid drainage holes 115 on the upper side, and therefore, can be suitably used for the rising configuration. In the rising configuration, for example, the connection portion with the outgoing pipe 16 in the tank 3 may be provided on the lower part of the side wall of the tank 3 (close to the bottom 20 of the container 2 in FIG. 1), and the connection portion with the return pipe 17 in the tank 3 may be provided on the upper part of the side wall of the tank 3 (close to the top plate 21). In this case, out of all the electrolyte stored in the tank 3, the volume of electrolyte stored above the connection portion with the pipe 16 (the upper volume 61, imaginarily indicated by two-dot chain line hatching in FIG. 1) is likely to increase. Therefore, if the pipes 16 and 17 and the like are damaged to result in leakage of the electrolyte from the tank 3 into the container 2, the leakage amount is likely to increase. From the viewpoint of reduction of the leakage amount, and further prevention of leakage of electrolyte out of the container 2, the connection portions of the pipes 16 and 17 at the side wall of the tank 3 are preferably arranged below the liquid level of the electrolyte inside the tank 3 and at positions that are high to a certain degree, distant from the inner bottom face of the container 2 (the inner face of the bottom 20).

Quantitatively, as illustrated in FIG. 1, in the case where the height of the tank 3 and the height H of the container 2 are substantially equal to each other, for example, a connection portion with the pipes 16 and 17 in the tank 3 (the connection portion arranged at the lowest position) may be located higher than the position corresponding to 70% of the height H of the container 2 from the inner bottom face of the container 2. Here, the height H is defined as the distance from the inner bottom face of the container 2 to the inner top plate face of the container 2 (the inner face of the top plate 21). When the height position of the connection portion from the inner bottom face of the container 2 is located at the position corresponding to 70% or more of the height H of the container 2, as illustrated in FIG. 1, even when the connection portion is at a position equal to or lower than the liquid level inside the tank 3, the upper volume 61 is likely to be decreased, and the leakage amount is likely to be decreased. Moreover, leakage of the electrolyte out of the container 2 is likely to be prevented. When the height position of the connection portion is located at the position corresponding to 75% or more, 78% or more, or 80% or more of the height H, the upper volume 61 is further decreased, and the leakage amount is more likely to be decreased.

As will be described later, in the case where the container 2 is divided into a cell chamber 2C and a tank chamber 2T and the volume of the tank chamber 2T is set to be larger than that of the cell chamber 2C, the upper volume 61 is likely to increase. In this case, from the viewpoint of further decreasing the leakage amount, the height position of the connection portion is desirably located at the position corresponding to 70% or more of the height H.

(Container)

The battery cell 10C and the circulation mechanism are housed all together in the container 2. The container 2 is typically a dry container used for transporting general cargo and the like. The container 2 typically has a rectangular parallelepiped shape, and in particular, a horizontally long rectangular parallelepiped shape in the installation state as illustrated in FIG. 1 (in FIG. 1, the lower side of the sheet corresponds to the installation surface side). For example, such a container 2 includes a rectangular bottom 20 which corresponds to the installation portion, a rectangular top plate 21 which is arranged so as to face the bottom 20, a pair of side face portions 22 which connect the long sides of the bottom 20 to the long sides of the top plate 21 (refer to FIG. 2; in FIG. 1, only the side portion 22 on the back side of the sheet is shown), and a pair of end face portions 23 and 23d which connect the short sides of the bottom 20 to the short sides of the top plate 21. In this example, except for the end face portion 23d provided with a door, which will be described later, the end face portion 23 and the two side face portions 22 are preferably connected in a fluid-tight manner to the bottom 20. Hereinafter, in the installed state of the container 2, the dimension along the longitudinal direction of the container 2 is referred to as the "length", the direction that is orthogonal to the longitudinal direction and directed from the bottom 20 to the top plate 21 is referred to as the "height direction", the dimension along the height direction is referred to as the "height", the direction that is orthogonal to the longitudinal direction and directed from the one side face portion 22 to the other side face portion 22 is referred to as the "width direction", and the dimension along the width direction is referred to as the "width".

In the container 2 of this example, one end portion 23d (on the right side in FIG. 1) is provided with an openable/closable door. The worker can open/close the door as necessary for the purpose of performing adjustment of the operation conditions of the RF battery 1A, inspection of the components, and the like. The size of the door, the opening/closing method, and the like can be appropriately selected. In this example, substantially the entire end face portion 23d is used as a door, and a double door is provided. Accordingly, the size of an opening in the state where the double door is opened can be set to be substantially equal to an imaginary plane area of the end face portion 23d, which makes it easy for the worker to perform the adjustment of the conditions, inspection, and the like.

The size of the container 2 can be appropriately selected depending on the sizes and the like of the components to be housed. As the container 2, for example, an international marine cargo container in accordance with ISO standards (e.g., ISO 1496-1:2013) can be used. Typical examples thereof include a 20 ft container, a 40 ft container, and a 45 ft container, and also include taller containers, such as a 20 ft high cube container, a 40 ft high cube container, and a 45 ft high cube container. As the constituent material for the container 2, metal such as steel (e.g., rolled steel for general structure SS400) may be used. In the case where the constituent members of the container 2 are made of metal, preferably, regions that may possibly be brought into contact with electrolyte, at least, the inner face of the tank chamber 2T and the like, are provided with a coating layer formed of a paint layer of the above-described resin that does not react with electrolyte and has resistance to electrolyte, acid proof paint, or plating (e.g., metal, such as noble metal, nickel, or chromium). More preferably, the entire inner face of the container 2 (including a dividing portion 24 which will be described later) is provided with a coating layer.

The container 2 of this example is provided with a dividing portion 24 which divides the horizontally long internal space thereof into two parts in the longitudinal direction of the container 2. One end face portion 23d side is used as a cell chamber 2C which houses mainly the battery cell 10C, and the other end face portion 23 side (the left side in FIG. 2) is used as a tank chamber 2T which houses mainly the tank 3. The cell chamber 2C also houses the pipes 16 and 17 including the pump 18. In this housing state, the battery cell 10C and the tank 3 are arranged side by side in the longitudinal direction of the container 2 (FIG. 1). In a configuration in which the battery cell 10C and the pipes 16 and 17 and the like are housed on one end side of the container 2 and the tank 3 is housed on the other end side when the inside of the container 2 is viewed in the longitudinal direction (hereinafter, referred to as the "side configuration"), for example, in comparison with a configuration in which the battery cell 10C and some parts of the pipes 16 and 17 are arranged on the one end side, and the pump 18, the remaining parts of the pipes 16 and 17, and the like are arranged on the other end side, with the tank 3 being interposed therebetween (hereinafter, referred to as the "tank mediated configuration"), the arrangement state of the pipes 16 and 17 between the battery cell 10C and the tank 3 is easily simplified, and the connection work between the battery cell 10C and the pipes 16 and 17 is easily performed.

However, in the side configuration, during the installation of the RF battery 1A, when the container 2 containing the components is raised with a crane or the like, the container 2 may become inclined in some cases, which makes it difficult to place the bottom 20 in the predetermined installation location. Accordingly, by taking the weight balance into consideration so that the container 2 can be prevented from becoming inclined when being raised, preferably so that the bottom 20 can be horizontally maintained, it is preferable to adjust the volume allocation ratio between the cell chamber 2C and the tank chamber 2T, the mass and arrangement positions of the components housed inside the cell chamber 2C (including other members to be housed, which will be described later), the mass of the tank 3, and the like. In the tank mediated configuration, by arranging the tank 3 to be housed inside the container 2 such that the center of the tank 3 overlaps with the center in the longitudinal direction of the container 2, and by arranging the battery cell 10C to be housed on the one end side of the container 2 and the pump 18 and the like to be housed on the other end side so as to sandwich the tank 3, the weight balance is likely to be easily achieved.

The dividing portion 24 of this example is a rectangular plate which is stood from the bottom 20 and has such a height that the upper end thereof reaches the top plate 21 and a width extending from one side face portion 22 to the other side face portion 22, and in a way, has a size and shape similar to an imaginary plane area of the end face portion 23. Such a dividing portion 24 retains shape easily even if the tank 3 is composed of a flexible material, such as rubber. By providing insertion holes for inserting the pipes 16 and 17 to be connected to the tank 3 in the dividing portion 24, the electrolyte can be made to flow between the tank chamber 2T and the cell chamber 2C. The shape, size, and the like of the dividing portion 24 can be appropriately changed. At least part of the dividing portion 24 may be omitted. When the height of the dividing portion 24 from the inner face of the bottom 20 is set, for example, to be lower than the connection portions with the pipes 16 and 17 in the tank 3, the insertion holes can be made unnecessary.

The joint between the dividing portion 24 and the bottom 20 is maintained substantially fluid-tight. Therefore, in the case where the electrolyte leaks from the tank 3 and the like into the cell chamber 2C, the electrolyte does not substantially leak through a gap between the dividing portion 24 and the bottom 20, and the range of electrolyte leakage can be limited within the cell chamber 2C. In this case, disposal and the like after leakage are easily performed.

The dividing portion 24 may be provided such that the cell chamber 2C and the tank chamber 2T have desired volumes. In this example, the dividing portion 24 is provided at the position where the volume of the tank chamber 2T is about twice the volume of the cell chamber 2C, but this can be changed appropriately. For example, the volume of the tank chamber 2T can be substantially equal to the volume of the cell chamber 2C, and the volume of the cell chamber 2C can be increased (the volume of the tank chamber 2T can be decreased).

In addition, when an insulating material is disposed in regions surrounding the tank 3 in the container 2, changes in temperature of the electrolyte 6 inside the tank 3 due to the environment outside the container 2 are likely to be suppressed, which is preferable. In this example, an insulating material may be provided on the dividing portion 24, the end face portion 23 on the left side, the bottom 20, the top plate 21, and the two side face portions 22, in regions where the tank chamber 2T is formed.

(Partition Wall)

A partition wall 4A is further provided inside the container 2. In the case where the pipes 16 and 17 and the like are damaged to result in leakage of a predetermined amount of electrolyte into the container 2, the partition wall 4A is a member that prevents further leakage of the electrolyte through a gap between the door (the end face portion 23d) and the bottom 20 and the like, and holds the electrolyte inside the container 2. For this purpose, the partition wall 4A of this example is provided in the vicinity of an opening on the end face portion 23d side so as to cover a lower region of the opening.

The partition wall 4A of this example has a size that can cover the lower region. Specifically, the width of the partition wall 4A corresponds to the width of the opening on the end face portion 23d side (also refer to FIG. 2). The height $H_{4A}$ of the partition wall 4A is equal to or greater than a liquid level height at the time when a predetermined amount of electrolyte leaks into the container 2. In this example, the predetermined amount is defined as the total of an amount equivalent to the volume of the battery cell 10C, an amount equivalent to the volumes of the pipes 16 and 17, and an amount equivalent to the upper volume 61 of electrolyte stored above a connection portion with piping in the tank 3, out of all the electrolyte 6 stored in the tank 3. Here, the connection portion with piping is defined as the connection portion arranged at the lowest position among the connection portions with the pipes 16 and 17 in the tank 3 (the connection portion with the pipe 16 in the illustration of FIG. 1). Here, the liquid level height is defined as the distance from the inner face of the bottom 20 to the liquid level. The height $H_{4A}$ is defined as the minimum distance from the inner face of the bottom 20 to the upper end of the partition wall 4A.

In this example, the minimum value of the height $H_{4A}$ of the partition wall 4A is calculated assuming that all of the predetermined amount of electrolyte has leaked into the cell chamber 2C. The cell chamber 2C is a region surrounded by the partition wall 4A, the dividing portion 24, and regions of two side face portions 22 in which the cell chamber 2C is formed (in FIG. 1, imaginarily indicated by two-dot chain line crosshatching). Accordingly, the minimum value of the height $H_{4A}$ can be calculated from the upper volume 61 (the product of the length of the tank 3, width of the tank 3, and the height $H_3$ from the connection portion with the pipes 16 and 17 to the inner top face of the tank 3), the volume of the battery cell 10C, the volumes of the pipes 16 and 17, and the length and width of the cell chamber 2C.

The height $H_{4A}$ of the partition wall 4A needs be equal to or greater than the liquid level height at the time when the predetermined amount of electrolyte leaks into the container 2 (into the cell chamber 2C in this example). When the height $H_{4A}$ is larger than this, electrolyte leakage out of the container 2 can be more surely prevented (also refer to Embodiment 2, the height $H_{4B}$ in FIG. 3, which will be described later). When the height $H_{4A}$ is excessively large, increases in size and weight of the partition wall 4A make it difficult for the worker to handle, which is likely to lead to an increase in the workload of the worker; for example, detachment of the partition wall 4A is required during assembly and the like, and it is difficult to enter the inside of the partition wall 4A during inspection and the like. From the viewpoint of reduction in the workload of the worker and the like, within the range that the height $H_{4A}$ is equal to or greater than the liquid level height, for example, the height $H_{4A}$ may be about 1.2 times or less, 1.15 times or less, or 1.1 times or less the liquid level height, or about 0.5 times or less, 0.48 times or less, or 0.45 times or less the height H of the container 2. As in this example, when the formation position of the partition wall 4A is near the end face portion 23d (door), in comparison with the case where the partition wall 4A is located closer to the dividing portion 24 (tank 3), the liquid level height of the leaked electrolyte inside the cell chamber 2C is likely to be decreased, and therefore, the height $H_{4A}$ of the partition wall 4A is likely to be decreased.

As the partition wall 4A, a plate or the like having the specific width and the specific height $H_{4A}$ can be used. Since the partition wall 4A comes into contact with electrolyte, the partition wall 4A may be formed of a material that does not react with electrolyte and has resistance to electrolyte, such as the above-described resin, rubber, or a metal plate composed of the above-described steel whose surface is provided with a coating layer of the resin. For example, when the partition wall 4A is fitted in a fitting frame (not shown), which is provided inside the container 2 (inside the cell chamber 2C in this example), by using a fastening member, such as bolts, detachment is facilitated. A sealing material (not shown) can be interposed between the partition wall 4A and the fitting frame. In this case, regardless of the constituent material for the partition wall 4A, fluid-tightness can be enhanced.

The partition wall 4A may be fitted in the vicinity of the formation position of a door, in particular, a door having such a size that the lower end of the door reaches the bottom 20, among the constituent members of the container 2. The partition wall 4A is provided so as to cover at least part of an opening that is opened and closed by such a door and to face an imaginary plane of the opening. In this example, the partition wall 4A is provided so as to face the end face portion 23d. The same applied to the case where a door is provided on the side face portion 22 or the end face portion 23. Note that the end face portions 23 and 23d and the two side face portions 22 are preferably connected in a fluid-tight manner to the bottom 20.

(Sensor)

Furthermore, when a leak detection sensor 40 is provided, electrolyte leakage occurring inside the container 2 can be detected in the early stage, which is preferable. From the viewpoint of early detection, the leak detection sensor 40 is preferably arranged inside the container 2, below the upper end of the partition wall 4A. FIG. 1 illustrates the case where the leak detection sensor 40 is arranged near the bottom 20. As the installation height (height from the inner face of the bottom 20) of the leak detection sensor 40 decreases closer to the bottom 20, leakage of the electrolyte can be detected in the early stage of leakage, i.e., during the period when the leakage amount is small. As a result, measures, such as stopping of the pump 18, can be taken quickly, and further leakage is likely to be prevented. Furthermore, disposal and the like after leakage can be reduced. The installation height may be, for example, about 50% or less, 40% or less, or 30% or less of the height $H_{4A}$ of the partition wall 4A, or about 25% or less, 20% or less, or 15% or less of the height H of the container 2.

As the leak detection sensor 40 and a leak detection sensor 42, which will be described later, known liquid leakage sensors capable of detecting electrolyte leakage can be appropriately used. For example, when float type leak detection sensors are used (refer to Patent Literature 1), electric power is not required, and detection can be performed during power failure or the like.

(Other Members to be Housed)

In addition, the container 2 can also house a control unit which controls equipment and the like involved in circulating electrolyte, such as the pump 18, in the circulation mechanism, and a ventilation mechanism of the tank 3, which will be described below, and the like (none of these shown). Regarding equipment, such as the battery cell 10C, the pump 18, and the control unit, when the placement height from the bottom 20 is set at a position that is high to a certain degree while taking the weight balance into consideration, even if the electrolyte leaks into the container 2 from the tank 3, the equipment is unlikely to be immersed in the leaked electrolyte.

The ventilation mechanism of the tank 3 includes, for example, a gas generator, a gas flow control mechanism, a backflow prevention mechanism, tubes to be connected to the tank 3, and the like.

The gas generator generates a flow gas for ventilating the gas phase of the tank 3. Here, in an RF battery, for example, due to a side reaction accompanying the battery reaction or the like, a hydrogen element-containing gas may be generated and accumulated in the gas phase of a negative electrolyte tank. For example, by ventilating the gas phase of the negative electrolyte tank 35 by using a flow gas, the hydrogen concentration in the gas phase of the negative electrolyte tank 35 can be decreased before discharging into the atmosphere. Preferably, the flow gas contains an inert gas or is substantially an inert gas. Examples of the inert gas include nitrogen and noble gases (argon, neon, and helium). In the case of a gas generator capable of generating nitrogen, since nitrogen can be extracted from the atmosphere, it is possible to semi-permanently supply a flow gas.

The gas flow control mechanism controls the feed rate of a flow gas to be supplied from a gas supply source, such as the gas generator, to the gas phase of the tank 3. The gas flow control mechanism includes, for example, a flow meter and a valve, and controls the valve opening on the basis of the flow rate measured by the flow meter. Determination of the opening on the basis of the flow rate, operation of the valve, and the like may be performed by the control unit described above.

The backflow prevention mechanism is provided on an exhaust tube connected to the tank 3 and prevents backflow of the exhaust gas into the gas phase of the tank 3. As the backflow prevention mechanism, for example, a known water seal valve or the like can be used.

Examples of a specific configuration for ventilating the gas phase of the tank 3 by using the flow gas include configurations (1) and (2) in which the two tanks 34 and 35 are continuously ventilated, and configuration (3) in which the tanks 34 and 35 are independently ventilated. In configuration (1): positive electrolyte tank 34⇒negative electrolyte tank 35⇒exhaustion, the gas phases of the two tanks 34 and 35 are connected to each other by a communicating tube, the gas generator is connected to the gas phase of the positive electrolyte tank 34, and an exhaust tube is connected to the gas phase of the negative electrolyte tank 35. A flow gas is introduced into the gas phase of the positive electrolyte tank 34, and the flow gas is also supplied via the positive electrolyte tank 34 and the communicating tube to the gas phase of the negative electrolyte tank 35 and discharged from the exhaust tube. One end of the exhaust tube is connected to the tank 3, and the other end is open to the outside of the container 2 so that the gas is discharged to the atmosphere outside the container 2, or is open to the inside of the container 2 so that the gas is discharged from a ventilating hole provided in the side face portion 22 or the like of the container 2. In configuration (2): negative electrolyte tank 35⇒positive electrolyte tank 34⇒exhaustion, a communicating tube is connected as in configuration (1).

Contrary to configuration (1), an exhaust tube is connected to the gas phase of the positive electrolyte tank 34, and the gas generator is connected to the gas phase of the negative electrolyte tank 35. A flow gas is introduced into the gas phase of the negative electrolyte tank 35, and the flow gas is also supplied via the communicating tube and the gas phase of the negative electrolyte tank 35 to the gas phase of the positive electrolyte tank 34 and discharged. In configuration (3), the gas generator and an exhaust tube are connected to the gas phase of each of the tanks 34 and 35, and a flow gas is introduced into the gas phase of each of the tanks 34 and 35 and discharged.

(Application)

The RF battery 1A according to Embodiment 1 can be used as a storage battery, with respect to power generation by natural energy, such as solar photovoltaic power generation or wind power generation, for the purpose of stabilizing variation of power output, storing generated power during oversupply, load leveling, and the like. Furthermore, the RF battery 1A according to Embodiment 1 can be provided in a general power plant and used as a storage battery as countermeasures against instantaneous power failure/power failure and for the purpose of load leveling.

(Main Effects)

The RF battery 1A according to Embodiment 1 is provided with the partition wall 4A with a specific height $H_{4A}$ inside the container 2. Accordingly, even if the pipes 16 and 17 and the like are damaged and a predetermined amount of electrolyte leaks into the container 2, further leakage out of the container 2 can be prevented by the partition wall 4A. The reason for this is that even if all of the predetermined amount of electrolyte leaks, the upper end of the partition wall 4A is located above the liquid level of the leaked electrolyte. The predetermined amount in this example corresponds to the total of the leakage amount from the cell and the like and the amount equivalent to the upper volume 61 in the tank 3. Therefore, in the case where at least part of the amount of electrolyte equivalent to the volumes of the pipes 16 and 17 leaks into the container 2, and even in the case where all of the predetermined amount of electrolyte leaks into the container 2, further leakage out of the container 2 can be prevented. Furthermore, in the RF battery 1A of this example, since the electrolyte can be held between the dividing portion 24 constituting the cell chamber 2C and the partition wall 4A which is disposed so as to face the dividing portion 24, i.e., below the opening on the end face portion 23*d* side, even if the door is opened when performing disposal and the like after leakage, the electrolyte does not leak out of the partition wall 4A. In the case where a leak detection sensor 40 is provided, leakage of the electrolyte can be detected during the period when the leakage amount is relatively small, and leakage of the electrolyte out of the container 2 can be more surely prevented. In such an RF battery 1A, the dam portion surrounding the outer periphery of the container 2 described above can be omitted, or the structure of the dam portion can be simplified, and shortening of the installation period and shortening of the construction period at the time of change in arrangement can be expected.

Furthermore, the RF battery 1A of this example has the following effects:

(1) Since components, such as the battery cell 10C, the tank 3, and the pipes 16 and 17, are housed all together in one container 2, transportation is facilitated, installation is facilitated, and the components can be protected by the container 2, all of which are effective.

(2) The inside of the container 2 is divided into the cell chamber 2C and the tank chamber 2T, and the pipes 16 and 17 are placed together inside the cell chamber 2C. Therefore, the total length of the pipes 16 and 17 is likely to be decreased. From this standpoint, likelihood of reducing electrolyte leakage due to damage to the pipes 16 and 17 can be expected. Furthermore, since the total length is small, assembly time can be shortened, and excellent assembly workability can be obtained.

(3) Since the inside of the container 2 is divided into the cell chamber 2C and the tank chamber 2T, inspection of the battery cell 10C, the pump 18, the control unit, and the like can be easily performed.

Embodiment 2

Figure 3:
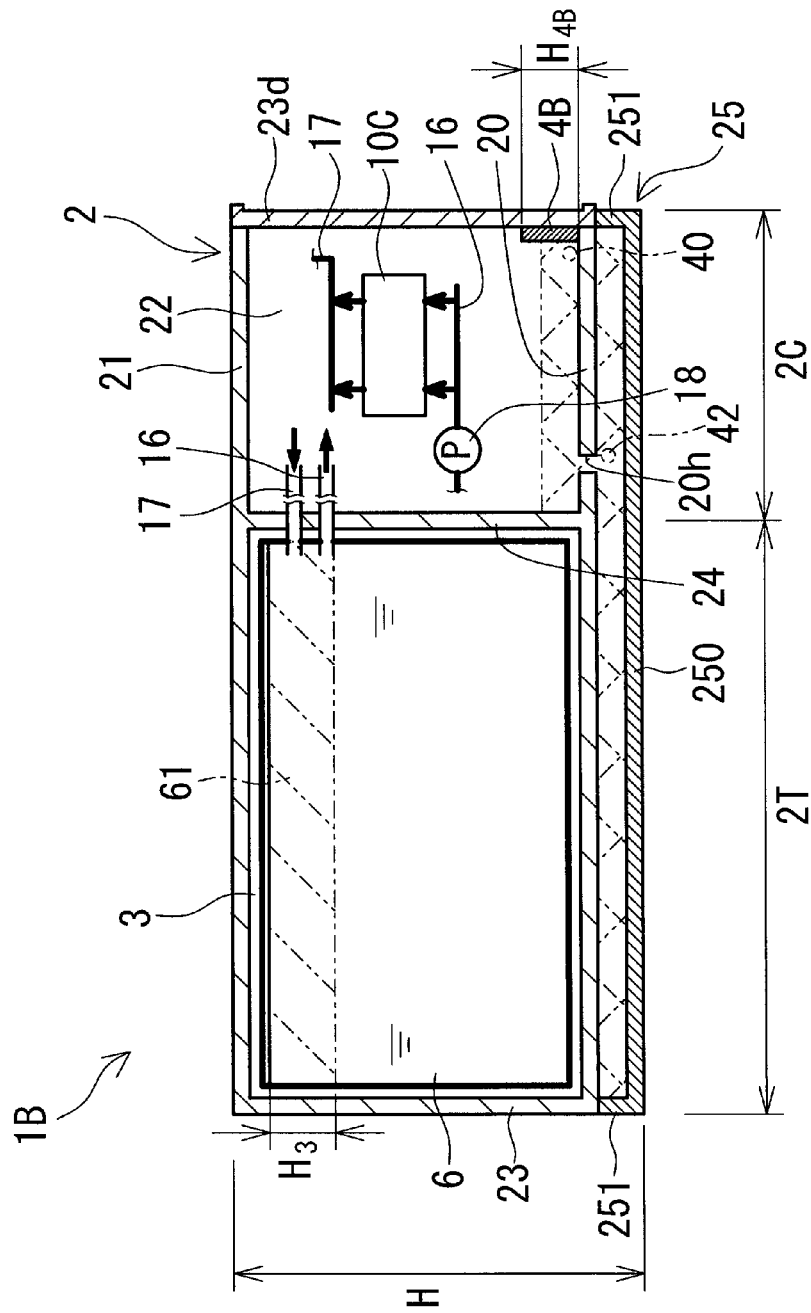
FIG. 3 is a schematic diagram schematically showing a redox flow battery according to Embodiment 2.

An RF battery 1B according to Embodiment 2 will be described below with reference to mainly FIG. 3.

The basic structure of the RF battery 1B according to Embodiment 2 is the same as that of the RF battery 1A according to Embodiment 1 and includes a battery cell 10C, a tank 3, pipes 16 and 17, a partition wall 4B, and a container 2 which houses these components. The RF battery 1B according to Embodiment 2 further includes a lower pit portion 25 which is fitted to a bottom 20 of the container 2, and in the case where the electrolyte leaks from the tank 3 and the like into the container 2, part of the leaked liquid can be stored in the lower pit portion 25. The major difference from Embodiment 1 is that the lower pit portion 25 is provided. The difference of Embodiment 2 from Embodiment 1 will be described in detail below, and regarding the structure in common with Embodiment 1 and the effects thereof, a detailed description will be omitted.

(Lower Pit Portion)

The lower pit portion 25 is a tray-like member and includes a bottom 250 and a peripheral wall portion 251 which is stood from the periphery of the bottom 250. The lower pit portion 25 is fitted to the bottom 20 of the container 2 provided in the RF battery 1B, and in a way, a double bottom is formed, in which the bottom 20 of the container 2 serves as an inner bottom and the bottom 250 of the lower pit portion 25 serves as an outer bottom. The bottom 20 which is the inner bottom has an opening 20*h* passing therethrough from the inside to the outside (from the front to the back) thereof. The lower pit portion 25 includes a storage tank which stores the electrolyte that has leaked into the container 2 and passed through the opening 20*h*. Part of the inner face of the storage tank is located below the opening 20*h*, and the storage tank is provided so as to cover the opening 20*h*. The lower pit portion 25 of this example is entirely used as the storage tank.

The shape and size of the lower pit portion 25 can be appropriately selected. The bottom 250 of the lower pit portion 25 of this example has a rectangular shape with substantially the same size as the bottom 20 of the container 2. The peripheral wall portion 251 is in the shape of a rectangular frame following the external shape of the bottom 250. Since the plane shape and plane area of the lower pit portion 25 are substantially the same as those of the bottom 20 of the container 2, the lower pit portion 25 is likely to support the container 2 fitted thereon in a stable manner. The lower pit portion 25, in a way, can serve as an installation stand of the container 2. When an appropriate reinforcement (not shown) is provided inside the lower pit portion 25, the lower pit portion 25 can serve as a stronger installation stand.

The volume of the storage tank in the lower pit portion 25 can be appropriately selected. As the size of the storage tank increases, the liquid level height of the electrolyte that has leaked into the container 2 (into the cell chamber 2C in this example) is likely to be decreased, and leakage of the electrolyte out of the container 2 is likely to be prevented. From the viewpoint of being able to decrease the liquid level height inside the container 2, the height $H_{4B}$ of the partition wall 4B (in particular, the lower limit) is likely to be decreased. When the lower limit of the height $H_{4B}$ of the partition wall 4B is small, the height $H_{4B}$ is easily set so as to exceed the liquid level height to some extent. As illustrated in FIG. 3, when the height $H_{4B}$ is sufficiently larger than the liquid level height, it is possible to more surely prevent the electrolyte that has leaked into the container 2 from leaking out of the container 2. The volume of the storage tank may be, for example, about 50% to 90%, 55% to 85%, or 60% to 80% of the predetermined amount (in this example, the total of the leakage amount from the cell and the like and the amount equivalent to the upper volume 61).

In order to increase the size of the storage tank, at least one of the length, width, and height may be adjusted. When the height of the storage tank is excessively large, there is a possibility that the installation state of the container 2 will become unstable due to the excessively high lower pit portion 25. Therefore, it is considered to be preferable to increase the length and width of the storage tank. In this example, the lower pit portion 25 is entirely used as the storage tank, the length of the storage tank is set to be equivalent to the overall length of the bottom 20 of the container 2 (≈equivalent to the overall length of the bottom 250 of the lower pit portion 25), and the width of the storage tank is set to be equivalent to the overall width of the bottom 20 of the container 2 (≈equivalent to the overall width of the bottom 250 of the lower pit portion 25). Note that the volume of the storage tank can be smaller than that of this example.

The lower pit portion 25 in the state of being fitted to the container 2 can be transported to the installation site of the RF battery 1B. Alternatively, only the lower pit portion 25 may be preliminarily installed at the installation site, and the container 2 may be placed on the lower pit portion 25.

Furthermore, the size of the lower pit portion 25 and the size of the container 2 can be adjusted such that the size of the container 2 including the lower pit portion 25 satisfies the standard value of the container described above.

The size (the opening area, width, length, and the like), shape, formation position, number of openings, etc. of the opening 20h provided in the bottom 20 of the container 20 can be appropriately selected. In this example, a plurality of long holes extending in the width direction of the bottom 20 are provided at positions close to the dividing portion 24 in the bottom 20, and the long holes constitute the opening 20h. When a plurality of through-holes passing through the bottom 20 from the inside to outside thereof constitute the opening 20h, a total opening area that is large to a certain degree is likely to be secured, and the electrolyte can be easily made to flow into the storage tank. Furthermore, the opening area of each of the through-holes is likely to be decreased, and it is possible to easily prevent pieces of foreign matter from falling into the storage tank through the through-holes. In the case where each of the through-holes is large to a certain degree, by arranging a mesh material or the like over the opening, falling of pieces of foreign matter can be prevented while the electrolyte can be made to flow into the storage tank.

(Sensor)

Furthermore, when a leak detection sensor 42 is provided inside the storage tank of the lower pit portion 25, electrolyte leakage occurring inside the container 2 can be detected in the early stage, which is preferable. The reason for this is that in the early stage of electrolyte leakage, the electrolyte is accumulated inside the storage tank. By detecting electrolyte leakage during the period when the leakage amount is small, measures, such as stopping of the pump 18, can be taken quickly, further leakage is likely to be prevented, and also disposal after leakage can be reduced. In addition to the leak detection sensor 42 provided inside the storage tank, when a leak detection sensor 40 is also provided inside the container 2 (inside the cell chamber 2C in this example), the electrolyte leakage can be more surely detected. Furthermore, one of the two sensors 40 and 42 can be also used as a backup. It is also possible to provide a leak detection sensor 40 inside the container 2 and not to provide a leak detection sensor 42 inside the storage tank.

(Main Effects)

Since the RF battery 1B according to Embodiment 2 includes, in addition to the partition wall 4B, the lower pit portion 25, the liquid level height of the leaked liquid inside the container 2 (inside the cell chamber 2C in this example) can be decreased as described above. Accordingly, even when all of the predetermined amount of electrolyte leaks into the container 2, leakage of the electrolyte out of the container 2 is more likely to be prevented. In particular, even when the height $H_{4B}$ of the partition wall 4B inside the container 2 is further decreased ($H_{4B}<H_{4A}$), leakage of the electrolyte out of the container 2 can be prevented, and the weight and size of the partition wall 4B can be reduced. In the RF battery 1B according to Embodiment 2, omission of the dam portion surrounding the outer periphery of the container 2, shortening of the installation period and the construction period at the time of change in arrangement as a result of omission of the dam portion, improvement in assembly workability due to reduction in size and weight of the partition wall 4B, and the like can be expected. Furthermore, from the viewpoint of being able to decrease the liquid level height of the leaked liquid inside the container 2, it is possible to easily reduce or avoid immersion of electrical equipment, such as the battery cell 10C, the pump 18, and the control unit, in the electrolyte. Regarding the inner face itself of the container 2, it is possible to reduce the area that is contaminated with the leaked electrolyte. Accordingly, disposal and the like after electrolyte leakage can be reduced.

Embodiment 3

An RF battery according to Embodiment 3 will be described below with reference to mainly FIG. 4.

The basic structure of the RF battery according to Embodiment 3 is the same as that of the RF battery 1B according to Embodiment 2. The major difference from Embodiment 2 is that the RF battery includes a small wall portion 26 which is stood between the formation position of an opening 20h and the formation position of a partition wall 4B (located on the right side in FIG. 4) on a bottom 20 of a container 2, and the height $H_{26}$ of the small wall portion 26 is smaller than the height $H_{4B}$ of the partition wall 4B. The difference of Embodiment 3 from Embodiment 2 will be described in detail below, and regarding the structure in common with Embodiment 2 and the effects thereof, a detailed description will be omitted.

Figure 4:
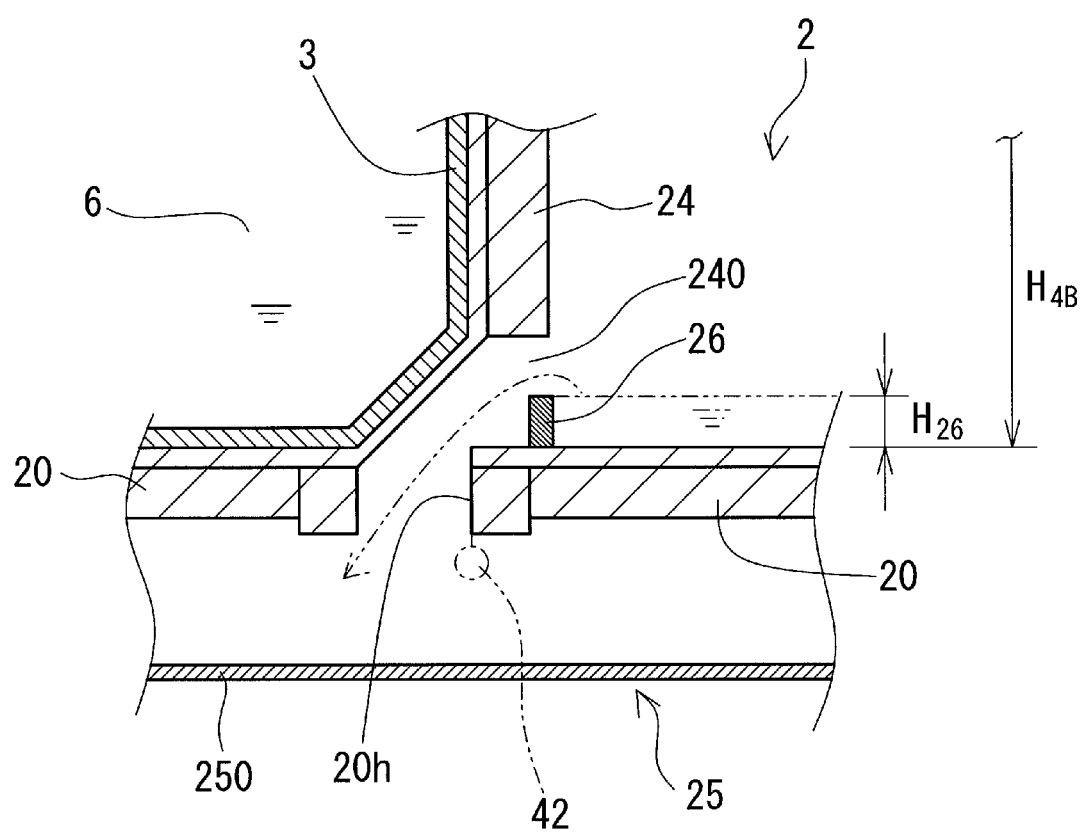
FIG. 4 is an enlarged partial sectional view showing an opening provided in the bottom of a container and its vicinity in a redox flow battery according to Embodiment 3.

FIG. 4 is a longitudinal sectional view of an RF battery according to Embodiment 3, taken along a plane orthogonal to the container 2 width direction, and showing, in an enlarged manner, an opening 20h provided in the bottom 20 of the container 2 and its vicinity.

In the container 2 of this example, apertures 240 are provided at predetermined intervals when a connection portion between the dividing portion 24 and the bottom 20 is viewed in the width direction of the container 2. As shown in FIG. 4, at a certain longitudinal cross section, an aperture 240 extending in the height direction between the dividing portion 24 and the bottom 20 can be seen. In this example, the connection portion (lower end portion) with the bottom 20 in the dividing portion 24 has an irregular shape and forms apertures 240 when connected to the inner face of the bottom 20. In the bottom 20 of this example, an opening 20h is provided in a region closer to the tank 3 than to the aperture 240 (on the left side in FIG. 4), and a small wall portion 26 is stood in a region near the inner periphery of the opening 20h and on the opposite side to the tank 3 (on the partition wall 4B side; on the right side in FIG. 4). The small wall portion 26 of this example is a rectangular plate with a width corresponding to the overall width of the bottom 20 and a height $H_{26}$ that is smaller than the height of the aperture 240. The small wall portion 26 is provided on the bottom 20 so as to face the partition wall 4B.

The height $H_{26}$ of the small wall portion 26 (the distance from the inner face of the bottom 20 to the upper end of the small wall portion 26) may be smaller than the height $H_{4B}$ of the partition wall 4B and can be appropriately selected depending on the size of the aperture 240, the size of the opening 20h, and the like. The height $H_{26}$ may be, for example, about 80% or less of the height $H_{4B}$ of the partition wall 4B. The height $H_{26}$ can be about 50% or less, 40% or less, or 30% or less of the height $H_{4B}$ of the partition wall 4B. The formation position of the small wall portion 26 can be appropriately selected between the formation position of the opening 20h and the formation position of the partition wall 4B. When the formation position of the small wall portion 26 is near the opening 20h as in this example, the volume of a small region interposed between the small wall portion 26 and the partition wall 4B is likely to be increased.

When the electrolyte leaks into the container 2 from the tank 3 and the like, the electrolyte is first accumulated in a small region surrounded by the small wall portion 26, the partition wall 4B, and parts of the two side face portions 22 (FIG. 2). When the leakage amount exceeds the volume of the small region, that is, the leakage amount exceeds the height $H_{26}$, as imaginarily indicated by the two-dot chain line arrow, the leaked electrolyte goes over the upper end of the small wall portion 26, flows through the aperture 240 and the opening 20h in that order, and flows down into the storage tank of the lower pit portion 25.

By providing the small wall portion 26, it is possible to extend the time from when the electrolyte leaks into the container 2 from the tank 3 and the like until the electrolyte is accumulated in the lower pit portion 25. In the RF battery according to Embodiment 3 provided with such a small wall portion 26, leakage of the electrolyte 6 inside the container 2 is likely to be found before the electrolyte is accumulated in the storage tank of the lower pit portion 25. In particular, in the case where a leak detection sensor (not shown) is provided at a position below the upper end of the small wall portion 26, leakage of the electrolyte can be detected during the period when the leakage amount is smaller, and measures, such as stopping of circulation of electrolyte, can be taken earlier. As a result, inside the container 2, the area contaminated with the leaked electrolyte can be further reduced, and disposal after leakage can be further reduced. Furthermore, when a leak detection sensor 42 is provided inside the storage tank of the lower pit portion 25 and/or when a leak detection sensor 40 (FIG. 3) is provided above the upper end of the small wall portion 26 and below the upper end of the partition wall 4B, leakage of the electrolyte 6 can be more surely detected in the early stage.

Embodiment 4

In an RF battery according to Embodiment 4, the predetermined amount for setting the height of the partition wall can be set equal to the leakage amount from the cell and the like.

In this embodiment, for example, connection portions with the pipes 16 and 17 in the tank 3 may be arranged on the top face of the tank 3. That is, the height position of the connection portions is located at the position corresponding to 100% of the height of the tank 3. In this case, the upper volume 61 can be made substantially zero. Accordingly, even when the pipes 16 and 17 and the like are damaged, the electrolyte 6 inside the tank 3 does not substantially leak into the container 2, and even in the case where the largest leakage is assumed, the leakage amount corresponds to the total of an amount equivalent to the volume of the battery cell 10C and an amount equivalent to the total volume of the pipes 16 and 17 (leakage amount from the cell and the like). Therefore, the height of the partition wall provided in the RF battery according to Embodiment 4 may be set equal to or greater than the liquid level height at the time when the electrolyte in the amount equivalent to the leakage amount from the cell and the like leaks into the container 2.

Thus, depending on the arrangement position of the connection portions with the pipes 16 and 17 in the tank 3 and the arrangement position of the liquid level inside the tank 3, the height of the partition wall can be further decreased. Therefore, in the RF battery according to Embodiment 4, while the size and weight of the partition wall can be further decreased, it is possible to prevent the electrolyte that has leaked into the container 2 from leaking out of the container 2. In the RF battery according to Embodiment 4, when the lower pit portion 25 described in Embodiment 2 and the small wall portion 26 described in Embodiment 3 are provided, the height of the partition wall can be further decreased.

The present invention is not limited to the examples described above, but the scope of the present invention is defined by the appended claims, and is intended to include all modifications within the meaning and scope equivalent to those of the claims. For example, the following modifications are possible.

(1) In FIGS. 1 and 2, the number of stacks, circulation passages, and the like are changed, the arrangement of the components housed inside the container 2 is changed, or the dividing portion 24 is omitted.

(2) The partition wall 4A or 4B is provided at another position, in addition to at the formation position of the door.

For example, the partition wall 4A described in Embodiment 1 may be provided separately so as to face the dividing portion 24, in addition to in the vicinity of the end face portion 23d. Alternatively, the partition wall 4A may have an L-shape and be provided so as to extend from the end face portion 23d to one of the side face portions 22, may be formed in the shape of a rectangular frame, or may be formed in the shape of a case with a closed bottom.

Other examples include an RF battery in which the battery cell 10C and the tank 3 are not housed in the same container 2, and which includes a battery container for housing a battery cell 10C and some parts of pipes 16 and 17 and a tank container for housing a tank 3 and the remaining parts of pipes 16 and 17. As the tank container, a positive electrode container for storing a positive electrolyte and a negative electrode container for storing a negative electrolyte may be independently provided. In such an RF battery, a partition wall may be provided near a door (end face portion 23d) of the battery container, and furthermore, a lower pit portion 25 may be provided on the lower side of the battery container. The height of the partition wall may be adjusted on the basis of the total of an amount equivalent to the volume of the battery cell and an amount equivalent to the volume of the piping housed in the battery container.

APPENDICES

In addition to Embodiments 1 to 4 described above, in the case where an electrolyte inside a tank has leaked into a container, an RF battery which can prevent the electrolyte from leaking out of the container may be configured as follows:

[Appendix 1]
A redox flow battery comprising:
a battery cell;
a tank which stores an electrolyte to be supplied to the battery cell,
piping which is connected to the battery cell and the tank and configured to circulate the electrolyte;
a container which houses the battery cell, the tank, and the piping all together; and
a lower pit portion which is fitted to a bottom of the container,
wherein the bottom has an opening passing therethrough from the inside to the outside thereof, and the lower pit portion includes a storage tank which stores the electrolyte that has leaked into the container and passed through the opening.

[Appendix 2]
The redox flow battery according to [Appendix 1], wherein the volume of the storage tank is equivalent to or more than the volume of electrolyte stored above a connection portion with the piping in the tank, out of all the electrolyte stored in the tank.

[Appendix 3]
The redox flow battery according to [Appendix 1] or [Appendix 2], wherein a leak detection sensor is provided inside the storage tank.

Regarding details of the lower pit portion in the above-described [Appendices], reference should be made to Embodiment 2. As explained in Embodiment 2, by storing the electrolyte in the storage tank of the lower pit portion, even when the partition wall 4B and the like are not provided, leakage of the electrolyte out of the container is likely to be prevented. In particular, when a leak detection sensor is provided ([Appendix 3]), leakage can be detected early, and as described above, measures, such as stopping of the pump, can be taken during the period when the leakage amount is small. Thus, even if the storage tank of the lower pit portion is small to a certain extent, leakage of the electrolyte out of the container can be prevented. When the volume of the storage tank is set to the specific value ([Appendix 2]), all the amount of electrolyte that has leaked into the container can be stored in the lower pit portion, and preferably, the electrolyte can be substantially prevented from being accumulated inside the container. As a result, leakage of the electrolyte out of the container can be more surely prevented.

REFERENCE SIGNS LIST 1A, 1B redox flow battery (RF battery)
10C battery cell
11 membrane
14 positive electrode
15 negative electrode
16, 17, 164, 165, 174, 175 pipe
18, 184, 185 pump
100 cell stack
110 cell frame
111 bipolar plate
112 frame body
113 liquid supply hole
114, 116 slit
115 liquid drainage hole
118 sealing material
120 sub-cell stack
122 supply/drainage plate
130 end plate
132 fastening member
2 container
2C cell chamber
2T tank chamber
20 bottom
20h opening
21 top plate
22 side face portion
23, 23d end face portion
24 dividing portion
240 aperture
25 lower pit portion (storage tank)
250 bottom
251 peripheral wall portion
26 small wall portion
3 tank
34 positive electrolyte tank
35 negative electrolyte tank
4A, 4B partition wall
40, 42 leak detection sensor
6 electrolyte
61 upper volume

The invention claimed is:
1. A redox flow battery comprising:
a battery cell;
a tank which stores an electrolyte to be supplied to the battery cell;
piping which is connected to the battery cell and the tank and configured to circulate the electrolyte;
a container which houses the battery cell, the tank, and the piping all together; and
a partition wall which is provided inside the container and prevents the electrolyte from leaking out of the container,
wherein a height of the partition wall is equal to or greater than a liquid level height at the time when a predetermined amount of electrolyte leaks into the container as a consequence of damage to the piping,
the predetermined amount includes the total of an amount equivalent to the volume of the battery cell and an amount equivalent to the volume of the piping, and
the height of the partition wall is less than a connection portion with the piping in the tank.

2. The redox flow battery according to claim 1, wherein the predetermined amount further includes an amount equivalent to the volume of electrolyte stored above the connection portion with the piping in the tank, out of all the electrolyte stored in the tank.

3. The redox flow battery according to claim 2, wherein the connection portion with the piping in the tank is located higher than the position corresponding to 70% of the height of the container from the inner bottom face of the container.

4. The redox flow battery according to claim 1, further comprising a lower pit portion which is fitted to a bottom of the container,
   wherein the bottom of the container has an opening passing therethrough from the inside to the outside thereof, and
   the lower pit portion includes a storage tank which stores the electrolyte that has leaked into the container and passed through the opening.

5. The redox flow battery according to claim 4, wherein a leak detection sensor is provided inside the storage tank.

6. The redox flow battery according to claim 1, wherein a leak detection sensor is provided at a position below an upper end of the partition wall, inside the container.

7. The redox flow battery according to claim 1, wherein the height of the partition wall is less than a bottom face of the battery cell.

8. The redox flow battery according to claim 1, wherein the container includes a bottom, a top plate which is arranged so as to face bottom, and end face portions which connect sides of the bottom to sides of the top plate, and
   the largest surface of a plurality of surfaces of the partition wall is provided in parallel with one of the end face portions.

9. The redox flow battery according to claim 1, wherein the container includes a bottom, a top plate which is arranged so as to face bottom, and end face portions which connect sides of the bottom to sides of the top plate, and
   the partition wall covers a lower region of an opening on one of the end face portions.

* * * * *

UNITED STATES PATENT AND TRADEMARK OFFICE
CERTIFICATE OF CORRECTION

| | |
|---|---|
| PATENT NO. | : 10,903,510 B2 |
| APPLICATION NO. | : 16/071547 |
| DATED | : January 26, 2021 |
| INVENTOR(S) | : Kazutaka Kawahigashi et al. |

It is certified that error appears in the above-identified patent and that said Letters Patent is hereby corrected as shown below:

In the Claims

In Claim 8, Column 24, Line 9, "so as to face bottom" should read -- so as to face the bottom --.

In Claim 9, Column 24, Line 16, "so as to face bottom" should read -- so as to face the bottom --.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*